US008238740B2

(12) United States Patent
Byon et al.

(10) Patent No.: US 8,238,740 B2
(45) Date of Patent: Aug. 7, 2012

(54) LIGHT QUANTITY ADJUSTMENT APPARATUS AND PHOTOGRAPHING APPARATUS INCLUDING THE SAME

(75) Inventors: Kwang-seok Byon, Yongin-si (KR);
Jin-gi Lee, Changwon-si (KR);
Young-jae Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/173,117

(22) Filed: Jun. 30, 2011

(65) Prior Publication Data
US 2012/0057859 A1    Mar. 8, 2012

(30) Foreign Application Priority Data
Sep. 8, 2010    (KR) .................. 10-2010-0088051

(51) Int. Cl.
*G03B 41/00* (2006.01)
*G03B 9/02* (2006.01)

(52) U.S. Cl. ........................... 396/323; 396/510
(58) Field of Classification Search .................. 396/323, 396/335, 340, 510; 348/49; 359/464
See application file for complete search history.

(56) References Cited

U.S. PATENT DOCUMENTS

| 4,290,675 | A  | * | 9/1981  | Beiser ............................. 396/324 |
| 5,828,487 | A  |   | 10/1998 | Greening et al. |
| 2002/0008907 | A1 | * | 1/2002 | Yamamoto .................... 359/464 |
| 2009/0269048 | A1 | * | 10/2009 | Suzuki .......................... 396/510 |

FOREIGN PATENT DOCUMENTS
WO    WO 91/19223 A1    12/1991

OTHER PUBLICATIONS
Search Report established for GB 1114808.7 (Oct. 7, 2011).

* cited by examiner

*Primary Examiner* — Clayton E Laballe
*Assistant Examiner* — Noam Reisner
(74) *Attorney, Agent, or Firm* — Drinker Biddle & Reath LLP

(57) ABSTRACT

A light quantity adjustment apparatus includes a support plate with a first through hole, a rotation plate with a second through hole corresponding to the first through hole and rotatable with respect to the support plate, 2D iris plates rotatably connected to the support plate so as to move between a location in which the first through hole is completely opened and another location in which the first through hole is completely closed, two 3D iris plates each having one end rotatably connected to the support plate and another end engaged with the rotation plate, a shading plate, and a shading plate driving unit. The 2D iris plates adjust an open area of the first through hole. The two 3D iris plates move between a retreat location away from the first through hole and a photographing location where a first photographing hole and a second photographing hole are formed.

20 Claims, 13 Drawing Sheets

LIGHT QUANTITY ADJUSTMENT APPARATUS AND PHOTOGRAPHING APPARATUS INCLUDING THE SAME

CROSS-REFERENCE TO RELATED PATENT APPLICATION

This application claims the priority benefit of Korean Patent Application No. 10-2010-0088051, filed on Sep. 8, 2010, in the Korean Intellectual Property Office, the entire disclosure of which is incorporated herein by reference.

BACKGROUND

1. Field of the Invention

Embodiments relate to a light quantity adjustment apparatus and a digital photographing apparatus including the same, and more particularly, to a photographing apparatus capable of selectively capturing a 3D image or a 2D image and a light quantity adjustment apparatus used for the same.

2. Description of the Related Art

A 3D image provides a stereoscopic effect for a subject observed by human vision. Although 3D images were only used for medical equipment, a lot of video is produced using 3D images, and 3D TV technology is rapidly developing.

To provide a 3D image, images that have been captured at different angles according to human eyes are simultaneously provided, and thus an apparatus for capturing a 3D image has a different operating structure that that of an apparatus for capturing a 2D image. Various types of apparatuses are used to capture a 3D image. However, since images viewed at different angles are simultaneously obtained, an optical structure or a mechanical structure of the apparatus for capturing a 3D image is more complicated than that of the apparatus for capturing a 2D image. Further, since a 2D image cannot be obtained by using the apparatus for capturing a 3D image, an additional camera is necessary for capturing a 2D image.

SUMMARY

Embodiments can provide a photographing apparatus capable of selectively capturing a 3D image or a 2D image and a light quantity adjustment apparatus used for the same.

Embodiments can also provide a light quantity adjustment apparatus capable of capturing a 3D image through a simple structure and a photographing apparatus including the same.

Embodiments can also provide a light quantity adjustment apparatus capable of achieving low noise and low power consumption and for capturing a 3D moving image and a photographing apparatus including the same.

According to an embodiment, there is provided a light quantity adjustment apparatus. The light quantity adjustment apparatus includes a support plate with a first through hole through which light passes, a rotation plate with a second through hole corresponding to the first through hole and rotatable with respect to the support plate, 2D iris plates rotatably connected to the support plate so as to move between an open location in which the first through hole is completely opened and a closed location in which the first through hole is completely closed, two 3D iris plates each having one end rotatably connected to the support plate and another end engaged with the rotation plate, a shading plate that moves between an operating location where the first photographing hole or the second photographing hole is closed and a stop location away from the first through hole, and a shading plate driving unit that drives the shading plate. The 2D iris plates engage with the rotation plate and adjust an open area of the first through hole according to a rotation of the rotation plate. The two 3D iris plates move between a retreat location away from the first through hole according to the rotation of the rotation plate and a photographing location where a first photographing hole and a second photographing hole are formed by covering a part of the first through hole.

The two 3D iris plates are disposed at the retreat location while the 2D iris plates may move from the closed location to the open location according to the rotation of the rotation plate, and, when the rotation plate further rotates after the 2D iris plates move to the open location, the 2D iris plates may remain at the open location and the two 3D iris plates may move to the photographing location.

The rotation plate may include first driving pins, and the 2D iris plates may include first guide grooves extending in such a way as to rotate the 2D iris plates according to the rotation of the rotation plate when the first driving pins are inserted into the first guide grooves.

Each of the first guide grooves may include driving region curved to rotate the 2D iris plates according to the rotation of the rotation plate, and a maintenance region extending bent from an end portion of the driving region so that the 2D iris plates remain at the open location according to the rotation of the rotation plate.

The rotation plate may include second driving pins, and the two 3D iris plates may include second guide grooves extending in such a way as to rotate the two 3D iris plates according to the rotation of the rotation plate when the second driving pins are inserted into the second guide grooves.

Each of the second guide grooves may include a non-operating region extending in a circumferential direction of the rotation plate so that the two 3D iris plates are at the retreat location while the first driving pins move along the driving region, and an operating region extending inclined from an end portion of the non-operating region so that the two 3D iris plates rotate according to the rotation of the rotation plate. The first driving pins may be at the maintenance region when the second driving pins are at the operating region.

The two 3D iris plates may include two concave portions in semicircle shapes corresponding to sidewalls of the first photographing hole and the second photographing hole and may be symmetrical to each other with respect to the first through hole.

The light quantity adjustment apparatus may further include at least two photographing hole adjustment plates symmetrical to each other with respect to the first through hole. Each of the at least two photographing hole adjustment plates may include a concave portion corresponding to one of the two concave portions of the two 3D iris plates and rotatably connected to the support plate, and a third guide groove with a non-operating region extending in such a way as to match the non-operating region of one of the second guide grooves and an operating region extending more inclined toward an inner side than the operating region of one of the second guide grooves and into which the second driving pins are inserted. When the second driving pins move toward end portions of the operating region of each of the second guide grooves and the operating region of each of the third guide grooves according to the rotation of the rotation plate, the at least two photographing hole adjustment plates may move more toward the sidewall of the first through hole so that sizes of the first photographing hole and the second photographing hole are reduced.

The at least two photographing hole adjustment plates may include cutting portions in opposite end portions thereof and spaced apart from each other so that the first photographing hole and the second photographing hole are connected to each other.

The 2D iris plates may be rotatably connected to one surface of the support plate. The rotation plate may be on another surface of the support plate, and the first driving pins may protrude from a surface of the rotation plate facing the support plate, may pass through guide holes formed in a circumferential direction of the support plate, and may be inserted into the first guide grooves of the 2D iris plates.

The two 3D iris plates may be in another surface of the rotation plate and have outer edges rotatably connected to the other surface of the support plate. The second driving pins may protrude from the other surface of the rotation plate and may be inserted into the second guide grooves formed in the two 3D iris plates.

The 2D iris plates may include first driving pins, and the rotation plate may include first guide grooves that guide the first driving pins so that the 2D iris plates rotate according to the rotation of the rotation plate when the first driving pins are inserted into the first guide grooves.

The two 3D iris plates may include second driving pins, and the rotation plate may include second guide grooves that guide the second driving pins so that the two 3D iris plates rotate according to the rotation of the rotation plate when the second driving pins are inserted into the second guide grooves.

The light quantity adjustment apparatus may further include a rotation plate driving unit that drives the rotation plate.

The rotation plate driving unit may include a motor in the support plate and a gear assembly connected to a rotational axis of the motor, and the rotation plate may include a gear surface engaged with the gear assembly on an outer circumferential surface thereof.

The rotation plate may include an outwardly protruding lever and may rotate by a force transferred through the lever.

According to another embodiment, there is provided a photographing apparatus. The photographing apparatus includes a light quantity adjustment apparatus, an imaging device that converts light that passes through the light quantity adjustment apparatus into an electrical signal, and a control unit that performs photographing by controlling an imaging device and a shading plate driving unit. The light quantity adjustment apparatus includes a support plate with a first through hole through which light passes, 2D iris plates rotatably connected to the support plate so as to move between an open location in which the first through hole is completely opened and a closed location in which the first through hole is completely closed, two 3D iris plates each having one end rotatably connected to the support plate and another end engaged with a rotation plate, a shading plate, and a shading plate driving unit for driving the shading plate. The 2D iris plates engage with the rotation plate and adjust an open area of the first through hole according to a rotation of the rotation plate. The two 3D iris plates move between a retreat location away from the first through hole according to the rotation of the rotation plate and a photographing location where a first photographing hole and a second photographing hole are formed by covering a part of the first through hole. The shading plate moves between a location where the first photographing hole or the second photographing hole is closed and a location away from the first through hole. The rotation plate includes a second through hole corresponding to the first through hole and is rotatable with respect to the support plate. The rotation plate is connected to the 2D iris plates and the two 3D iris plates. The rotation plate rotates between a 2D photographing region where the 2D iris plates operate and a 3D photographing region where the two 3D iris plates operate when the 2D iris plates are at the open location. When in a 2D photographing mode, the rotation plate is at the 2D photographing region, and the control units controls the shading plate driving unit and moves the shading plate to the retreat location to perform photographing, and when in a 3D photographing mode, the rotation plate is at the 3D photographing region, and the control unit controls the shading plate driving unit so that the shading plate closes the first photographing hole when obtaining a first image and the shading plate closes the second photographing hole when obtaining a second image.

When a moving image is captured in the 3D photographing mode, the control unit may synchronize an image quality of frames of the moving image and a frequency that controls the shading plate driving unit.

The rotation plate may include first driving pins, and the 2D iris plates may include first guide grooves. Each first guide groove may include a driving region curved to rotate the 2D iris plates according to the rotation of the rotation plate when the first driving pins are inserted into the first guide grooves, and a maintenance region extending bent from an end portion of the driving region so that the 2D iris plates remain at the open location according to the rotation of the rotation plate.

The rotation plate may include second driving pins, and the two 3D iris plates may include extending second guide grooves into which the second driving pins are inserted. Each of the second guide grooves may include a non-operating region extending in a circumferential direction of the rotation plate so that the two 3D iris plates are at the retreat location while the first driving pins move along the driving region, and an operating region extending inclined from an end portion of the non-operating region so that the two 3D iris plates rotate according to the rotation of the rotation plate.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments are shown.

Figure 1:
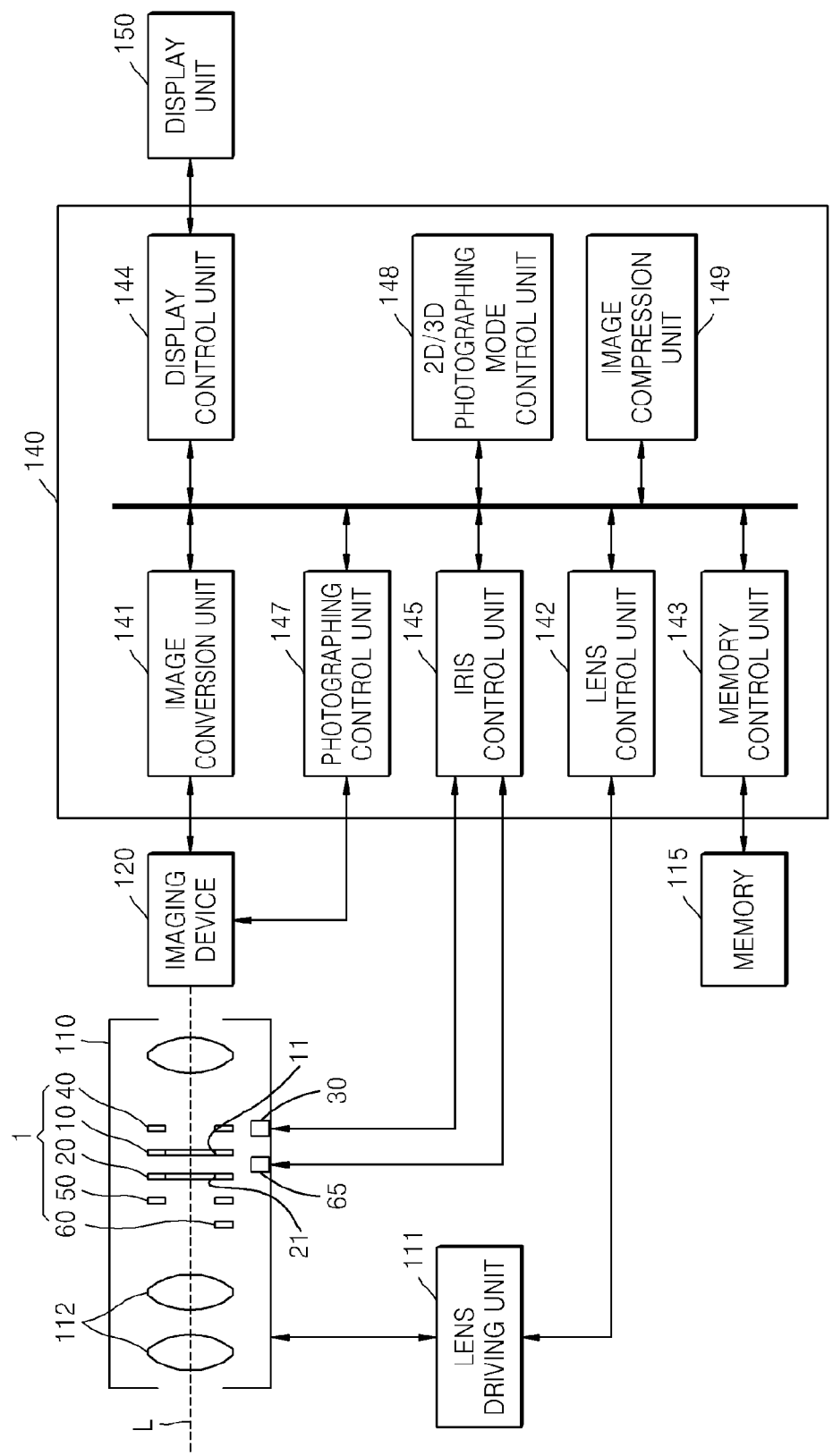
FIG. 1 is a block diagram of a photographing apparatus including a light quantity adjustment apparatus according to an embodiment.

FIG. 1 is a block diagram of a photographing apparatus including an apparatus 1 that can adjust a quantity of light according to an embodiment. Referring to FIG. 1, the photographing apparatus of the present embodiment can include the apparatus 1, an imaging device 120 that can convert light that passes through the apparatus 1 into an electrical signal, and a control unit 140 that can control the imaging device 120 and a shading plate driving unit 65 of the apparatus 1.

The apparatus 1 can include a support plate 10 that can include a first through hole 11 through which light passes, a rotation plate 20 that can include a second through hole 21 and can be rotatably coupled to the support plate 10, a 2D iris plate 40 that can adjust an open area of the first through hole 11 according to the rotation plate 20, a 3D iris assembly 50 that can operate according to the rotation plate 20 and closing a part of the first through hole 11 so as to perform 3D photographing, and a shading plate 60 that can be driven by the shading plate driving unit 65.

When the 2D iris plate 40 of the apparatus 1 adjusts the open area of the first through hole 11, the 3D iris assembly 50 and the shading plate 60 can move away from the first through hole 11. Thus, the control unit 140 can perform in a 2D photographing mode in which a 2D image is captured.

When the 3D iris assembly 50 of the apparatus 1 closes a part of the first through hole 11, the 2D iris plate 40 can move away from the first through hole 11, and the shading plate 60 can operate. Thus, the control unit 140 can perform in a 3D photographing mode in which a 3D image is captured. Therefore, the photographing apparatus can select any one of the 2D photographing mode and the 3D photographing mode and conveniently perform photographing.

The photographing apparatus of the present embodiment may be realized in various ways such as a digital still camera that can capture a still image and a digital video camera that can capture a moving image.

The imaging device 120 can capture an image of a subject and can convert the image into an electrical signal. The electrical signal can be converted into image data by an image conversion unit 141. A photographing control unit 147 of the control unit 140 can control the imaging device 120 to perform a photographing operation.

A plurality of lenses 112 that can form an optical system can be installed in a body tube 110. The plurality of lenses 112 can be disposed in front of the imaging device 120 and the apparatus 1 to form an image on an imaging surface of the imaging device 120 by using external light.

The lenses 112 can be disposed having variable spaces therebetween. If the spaces between the lenses 112 vary, a zooming magnification or a focus may be adjusted. The lenses 112 can be disposed along an optical axis L, such as, a rectilinear line connecting optical centers of the lenses 112.

The lenses 112 can be driven by a lens driving unit 111 that can include a driving member such as a zoom motor (not shown) so that locations of the lenses 112 can vary. The lenses 112 may include a zoom lens that can magnify or reduce a size of a subject and a focus lens that can adjust a focus of the subject.

The imaging device 120 can include a photoelectric conversion device such as a charge coupled device (CCD) or a complementary metal oxide semiconductor (CMOS). The imaging device 120 can convert image light passed through the lenses 112 and the apparatus 1 and incident on the imaging device 120 into an electrical signal. The imaging device 120 can be driven by a control signal applied from the photographing control unit 147.

The image conversion unit 141 can convert an electrical signal of the imaging device 120 into image data. Image processing may be performed on the image data, or the image data may be stored in a memory 115. For example, the image conversion unit 141 may convert the electrical signal of the imaging device 120 into RGB data and can convert the RGB data into raw data in the form of a YUV signal including a luminance signal Y and a chroma signal UV.

A process for converting an electrical signal of the imaging device 120 in the image conversion unit 141 may include, for example, reducing driving noise of the imaging device 120 included in the electrical signal by using a correlation double sampling (CDS) circuit, adjusting a gain of the electrical signal from which noise is reduced by using an automatic gain control (AGC) circuit, converting an analog signal into a digital signal by using an A/D converter, and performing signal processing on the digital signal, such as pixel defect correction, gain correction, white balance correction, and gamma correction. The CDS circuit, the AGC circuit, and the A/D converter may be realized as separate circuits.

The control unit 140 can be electrically connected to the imaging device 120, the lens driving unit 111, a display unit 150, the apparatus 1, and the memory 115. The control unit 140 can communicate a control signal with the above elements to control operations of the elements or process data.

The control unit 140 can include the image conversion unit 141, a lens control unit 142, a memory control unit 143, a display control unit 144, an iris control unit 145, the photographing control unit 147, a 2D/3D photographing mode control unit 148, and an image compression unit 149.

The control unit 140 may be realized as a micro chip or a circuit board including a micro chip. The above elements that can be included in the control unit 140 may be realized as software or circuits embedded therein.

The memory control unit 143 can control recording of data in the memory 115 and reading of recorded data or setting information of the photographing apparatus.

The memory 115 may be an embedded volatile memory, and, for example, a semiconductor storage device such as SDRAM. The memory 115 may perform a buffer memory function of temporarily storing image data generated by the imaging conversion unit 141 and a data processing job memory function.

The memory 115 may be a nonvolatile portable memory, for example, a flash memory such as an SD/MMC, a storage device such as an HDD, or an optical storage device such as a DVD or a CD. The memory 115 may store image data that is compressed and converted into the form of a JPEG file, a TIF file, a GIF file, a PCX file, or the like by the image compression unit 149.

The photographing apparatus may include the display unit 150 that can display an image of the image data. For example, the display unit 150 may be a touch screen that can detect a touch on a surface and can generate a signal corresponding to the detected touch on a display device such as an LCD or an OLED.

The 2D/3D photographing mode control unit 148 can set one of a 2D photographing mode and a 3D photographing mode as a photographing mode of the photographing apparatus. In 2D photographing mode, a 2D image can be captured, and in 3D photographing mode, a 3D image can be captured. Operations of the iris control unit 145 and the photographing control unit 147 may change according to the set photographing mode.

The iris control unit 145 can control driving of the shading plate 60 by applying a control signal to the shading plate driving unit 65 and can control a rotation operation of the rotation plate 20 by applying a control signal to a rotation plate driving unit 30.

Figure 2:
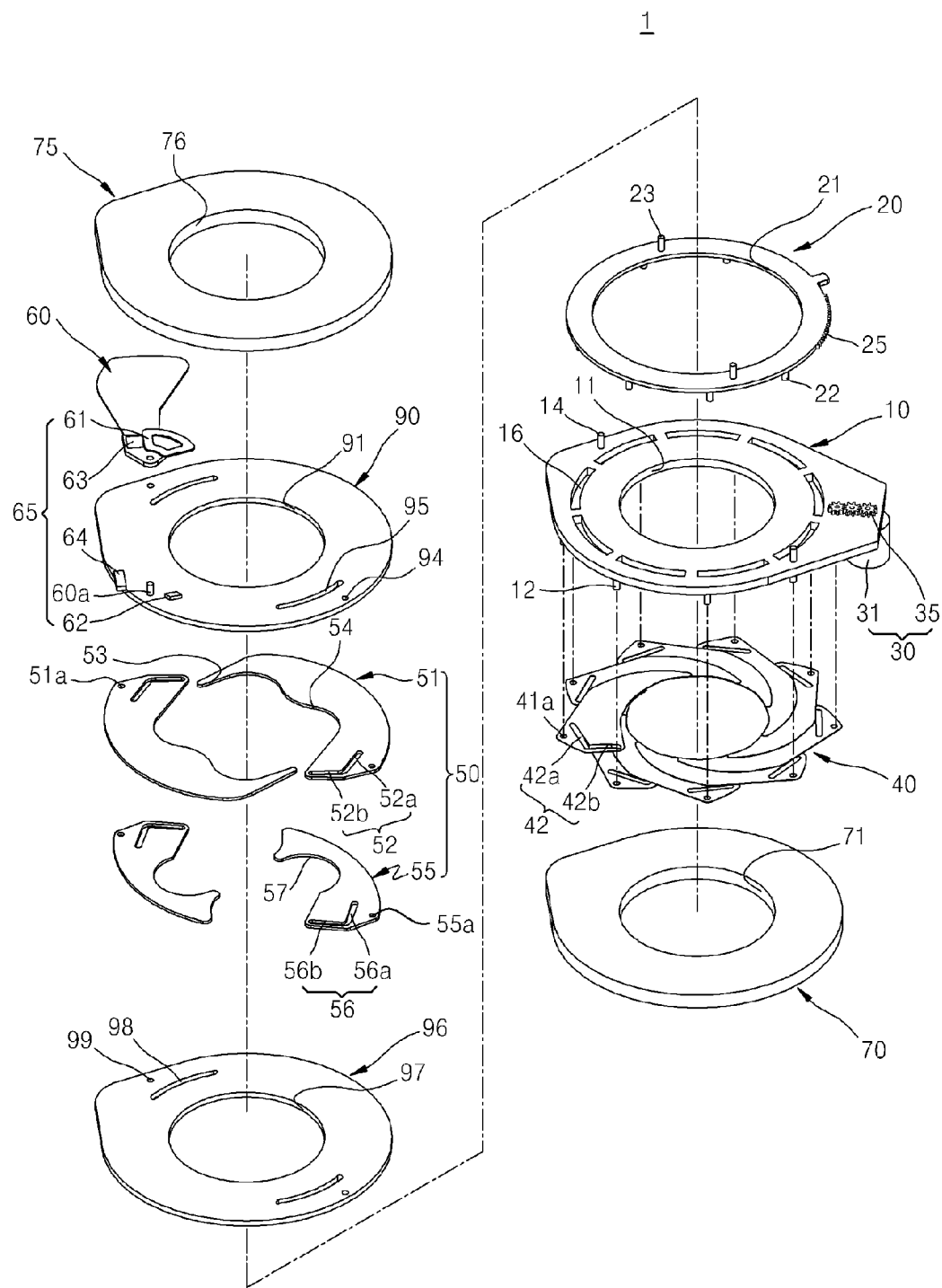
FIG. 2 is an exploded view of the light quantity adjustment apparatus of FIG. 1.
Figure 3:
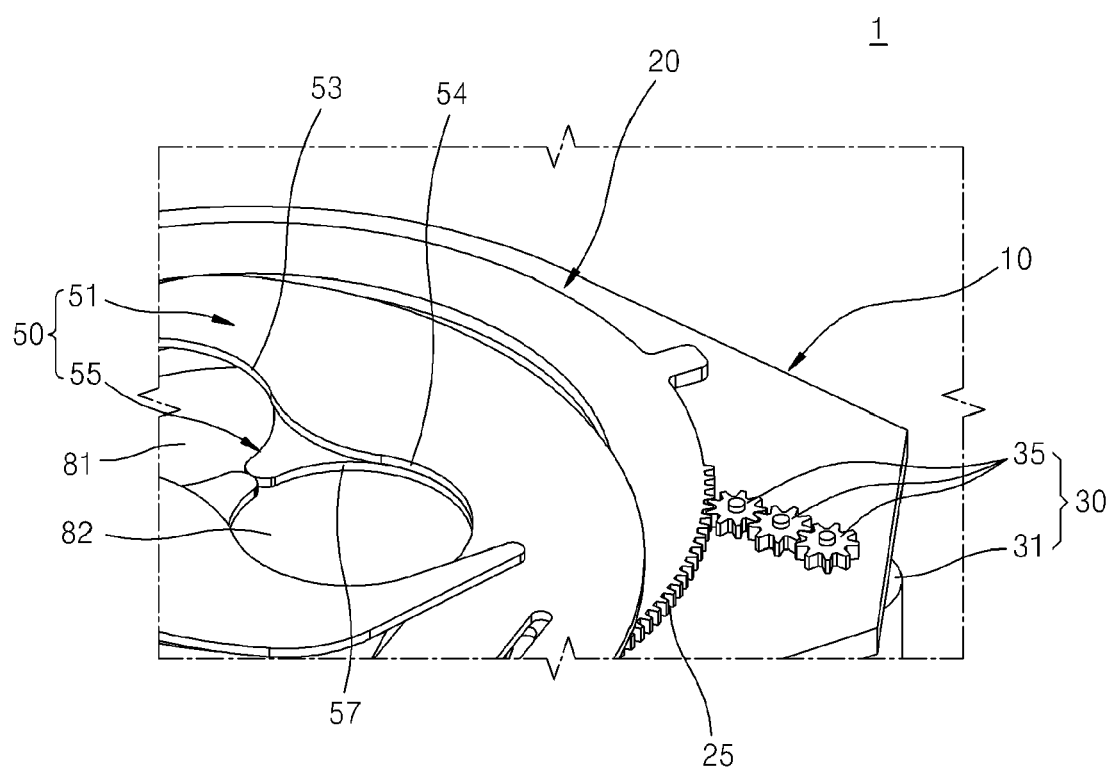
FIG. 3 is a partial perspective view of the light quantity adjustment apparatus of FIG. 2 in a coupling state.

FIG. 2 is an exploded view of the apparatus 1. FIG. 3 is a partial perspective view of the apparatus 1 of FIG. 2 in a coupling state.

Referring to FIGS. 2 and 3, the apparatus 1 can include the support plate 10 that can include the first through hole 11 through which light passes, the rotation plate 20 that can include the second through hole 21 corresponding to the first through hole 11 and can be rotatably disposed with respect to the support plate 10, the 2D iris plate 40 that can open or close the first through hole 11, the 3D iris assembly 50 that can move away from the first through hole 11 or can shade a part of the first through hole 11, the shading plate 60 that can move away from the first through hole 11 or can move onto the first through hole 11, and the shading plate driving unit 65 that can drive the shading plate 60.

The apparatus 1 having the above structure can control moving of the 2D iris plate 40, the 3D iris assembly 50, and the shading plate 60 according to a motion of the rotation plate 20. The apparatus 1 can assist the control unit 140 of FIG. 1 in selecting the 2D photographing mode in which a 2D image can be captured or the 3D photographing mode in which a 3D image can be captured and executing the selected photographing mode. Therefore, the photographing apparatus including the apparatus 1 can be used to execute both the 2D photographing mode and the 3D photographing mode without an additional device.

The support plate 10, the rotation plate 20, and the 2D iris plate 40, the 3D iris assembly 50, and the shading plate 60 may be produced using a metal material, such as aluminum or stainless steel, or a synthetic resin material.

The support plate 10 can be fixed to the body tube 110 of the photographing apparatus as shown in FIG. 1 and can function as a structure that can support the other elements of the apparatus 1.

The 2D iris plate 40 can be disposed at one side of the support plate 10, and the rotation plate 20 can be disposed at another side thereof. A rear cover 70 that can include a through hole 71 that can correspond to the first through hole 11 can be disposed on a surface of the 2D iris plate 40 facing away from the support plate 10. The rear cover 70 may cover and can support a rear side of the support plate 10 and the 2D iris plate 40. Light that passes through the first through hole 11 and the through hole 71 may be transferred to the imaging device 120 of FIG. 1.

A plurality of hinge pins 12 of the support plate 10 can be coupled into a plurality of coupling holes 41a of the 2D iris plate 40, and thus the 2D iris plate 40 can rotate with respect to the hinge pins 12. The 2D iris plates 40 can be continuously disposed around the first through hole 11, and thus a rotation of the 2D iris plate 40 can completely open or close the first through hole 11 or can adjust the open area of the first through hole 11.

The rotation plate 20 can include a plurality of first driving pins 22 that can protrude from a surface of the rotation plate 20 facing the support plate 10. The support plate 10 can include a plurality of guide holes 16 that can extend in a circumferential direction in such a way that the first driving pins 22 may pass through the guide holes 16. The first driving pins 22 can be inserted into a plurality of first guide grooves 42 of the 2D iris plate 40 through the guide holes 16. The first guide grooves 42 can be formed to extend, and thus a rotational force of the rotation plate 20 can be transferred to the first guide grooves 42 through the first driving pins 22, thereby rotating the 2D iris plate 40.

Each of the first guide grooves 42 can include a driving region 42b and a maintenance region 42a. The driving region 42b can be curved to rotate the 2D iris plate 40. The maintenance region 42a can be bent and can extend from an end portion of the driving region 42b and can maintain the 2D iris plate 40 at an open location in spite of a rotation of the rotation plate 20. The open location can indicate a location of the 2D iris plate 40 when the 2D iris plate 40 completely opens the first through hole 11. A closed location can indicate a location of the 2D iris plate 40 when the 2D iris plate 40 completely closes the first through hole 11.

Although the first guide grooves 42 can be formed in the 2D iris plate 40, and the rotation plate 20 can include the first driving pins 22, which are inserted into the first guide grooves 42, in the present embodiment with reference to FIG. 2, embodiments are not limited thereto, and different types of modifications may be implemented. For example, the 2D iris plate 40 may include the first driving pins 22, and the rotation plate 20 may include the first guide grooves 42 into which the first driving pins 22 can be inserted.

The 3D iris assembly 50 can form two holes by covering a part of the first through hole 11 so as to capture a 3D image. The 3D iris assembly 50 can include two 3D iris plates 51 that can be disposed symmetrical to each other with respect to the first through hole 11 and two photographing hole adjustment plates 55 that can be disposed symmetrical to each other with respect to the first through hole 11 and that can assist the two 3D iris plates 51.

The two 3D iris plates 51 can be disposed on another surface of the rotation plate 20. Two coupling holes 51a formed in edges of the two 3D iris plates 51 can be coupled to two hinge pins 14 protruding from a surface of the support plate 10 facing the rotation plate 20. The hinge pins 14 can be disposed in the support plate 10 around an outer edge of the rotation plate 20, and thus the hinge pins 14 can be coupled to the two 3D iris plates 51 without intervention from the rotation plate 20. The two 3D iris plates 51 having the above structure can rotate with respect to the hinge pins 14.

A first middle plate 96 including a through hole 97 that can correspond to the first through hole 11 can be disposed between the rotation plate 20 and the 3D iris assembly 50. A second middle plate 90 including a through hole 91 that can correspond to the first through hole 11 can be disposed between the 3D iris assembly 50 and the shading plate 60. The first middle plate 96 and the second middle plate 90 can support the 3D iris assembly 50 and the shading plate 60. The first middle plate 96 and the second middle plate 90 can include coupling holes 94 and 99 through which the hinge pins 14 can pass, respectively.

The rotation plate 20 can include two second driving pins 23 that can protrude from a surface of the rotation plate 20 facing away from the support plate 10. The first middle plate 96 and the second middle plate 90 can include guide holes 98 and 95 that can extend in a circumferential direction, respectively, in such a way that the two second driving pins 23 may pass through the guide holes 98 and 95. The two second driving pins 23 can be inserted into two second guide grooves 52 of the two 3D iris plates 51 and through the guide holes 98 and 95.

The second guide grooves 52 can extend in the two 3D iris plates 51, and thus a rotational force of the rotation plate 20 can be transferred to the second guide grooves 52 through the second driving pins 23, thereby rotating the two 3D iris plates 51.

Each of the second guide grooves 52 can include a non-operating region 52a and an operating region 52b. The non-operating region 52a can extend in a circumferential direction of the rotation plate 20 in order to allow the 3D iris plates 51 to maintain retreat locations thereof while the first driving pins 22 can move along the driving regions 42b. The operating region 52b can extend inclined from an end portion of the non-operating region 52a in order to allow the 3D iris plates 51 to rotate according to a rotation of the rotation plate 20. The retreat locations of the 3D iris plates 51 can indicate locations of the 3D iris plates 51 that can move away from the first through hole 11.

In connection with the non-operating regions 52a, which can extend in the circumferential direction of the rotation plate 20, since a relative location of the 3D iris plates 51 can vary with respect to the rotation plate 20 if the 3D iris plates 51 rotate with respect to the support plate 10, the non-operating regions 52a do not always extend in the circumferential direction of the rotation plate 20. The non-operating regions 52a can extend in the circumferential direction of the rotation plate 20 when the 3D iris plates 51 can maintain the retreat locations thereof until the 2D iris plate 40 moves from the closed location to the open location.

The first driving pins 22 can be disposed in the maintenance regions 42a of the first guide grooves 42 while the second driving pins 23 can be disposed in the operating regions 52b of the second guide grooves 52.

Although the second guide grooves 52 can be formed in the 3D iris plates 51, and the rotation plate 20 can include the second driving pins 23, which are inserted into the second guide grooves 52, in the present embodiment with reference to FIG. 2, embodiments are not limited thereto, and different types of modifications may be implemented. For example, the 3D iris plates 51 may include the second driving pins 23, and the rotation plate 20 may include the second guide grooves 52 into which the second driving pins 23 are inserted.

The 3D iris plates 51 can include two concave portions 53 and 54. The concave portions 53 and 54 can be in semicircle shapes corresponding to sidewalls of a first photographing hole 81 and a second photographing hole 82 that can be used for 3D photographing as shown in FIG. 3.

The photographing hole adjustment plates 55 can include a concave portion 57 that can correspond to one of the two concave portions 53 and 54 of the 3D iris plates 51 and can be rotatably coupled to the support plate 10. Coupling holes 55a of the photographing hole adjustment plates 55 can be hinged to the hinge pins 14 to which the 3D iris plates 51 can be hinged.

The photographing hole adjustment plates 55 can include two third guide grooves 56 into which the second driving pins 23 can be inserted. The third guide grooves 56 can extend corresponding to the shapes of the second guide grooves 52. The third guide grooves 56 can include non-operating regions 56a that can extend corresponding to the non-operating regions 52a of the second guide grooves 52 and operating regions 56b that can extend bent from the non-operating regions 56a.

When the non-operation regions 52a of the second guide grooves 52 and the non-operating regions 56a of the third guide grooves 56 match each other, the operating regions 56b of the third guide grooves 56 can be bent more toward inner sides thereof than the operating regions 52b of the second guide grooves 52. Due to such shapes of the operating regions 56b of the third guide grooves 56, if the second driving pins 23 move toward end portions of the operating regions 52b of the second guide grooves 52 and the operating regions 56b of the third guide grooves 56, the photographing hole adjustment plates 55 can move more toward a sidewall of the first through hole 11 than the 3D iris plates 51, and thus sizes of the first photographing hole 81 and the second photographing hole 82 can be reduced.

A front cover 75 that can include a through hole 76 that may correspond to the first through hole 11 can be coupled to an outermost part of the apparatus 1. The shading plate 60 can be movably disposed between the front cover 75 and the second middle plate 90.

Although the shading plate driving unit 65 that can drive the shading plate 60 can be realized as a voice coil motor in the present embodiment of FIG. 2, embodiments are not limited thereto, and various members such as a step motor or a solenoid may be used to rotate the shading plate 60. The shading plate driving unit 65 can include a coil 61, a magnet portion 63, a Hall sensor 62 that can detect a location of the shading plate 60 as the shading plate 60 rotates, and a yolk 64 fixed at a stop location of the shading plate 60 that can correspond to when the shading plate 60 is away from the first through hole 11.

The apparatus 1 can further include the rotation plate driving unit 30 that can drive the rotation plate 20. The rotation plate driving unit 30 can include a motor 31 that can be disposed in the support plate 10 and a gear assembly 35 that can be connected to a rotational axis of the motor 31 and can rotate. A gear surface 25 that can be geared into the gear assembly 35 can be formed in an outer circumferential surface of the rotation plate 20.

Figure 4:
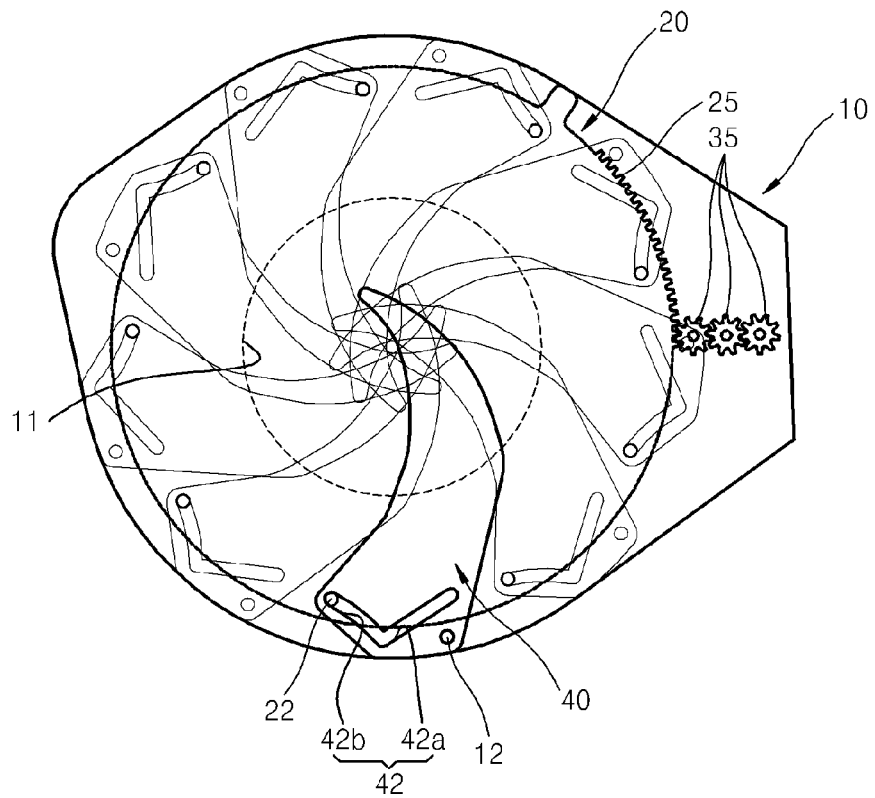
FIG. 4 is a conceptual diagram for explaining an operation of a 2D iris plate of the light quantity adjustment apparatus of FIG. 3.

FIG. 4 is a conceptual diagram for explaining an operation of the 2D iris plate 40 of the apparatus 1 of FIG. 3. Referring to FIG. 4, if the gear assembly 35 rotates according to the motor 31 of the rotation plate driving unit 30 shown in FIG. 3, the rotation plate 20 can rotate so that the 2D iris plate 40 operates. The 2D iris plate 40 may be disposed at the closed location in which the first through hole 11 can be completely closed. The first driving pins 22 that can be inserted into the first guide grooves 42 of the 2D iris plate 40 can be disposed in end portions of the driving regions 42b of the first guide grooves 42.

In a state where the 2D iris plate 40 is disposed at the closed location, since the driving regions 42b can extend curved in a radial direction of the rotation plate 20 across a rotational direction of the rotation plate 20, a rotational force of the rotation plate 20 can be transferred to the driving regions 42b through the first driving pins 22 so that the 2D iris plate 40 can rotate.

Figure 5:
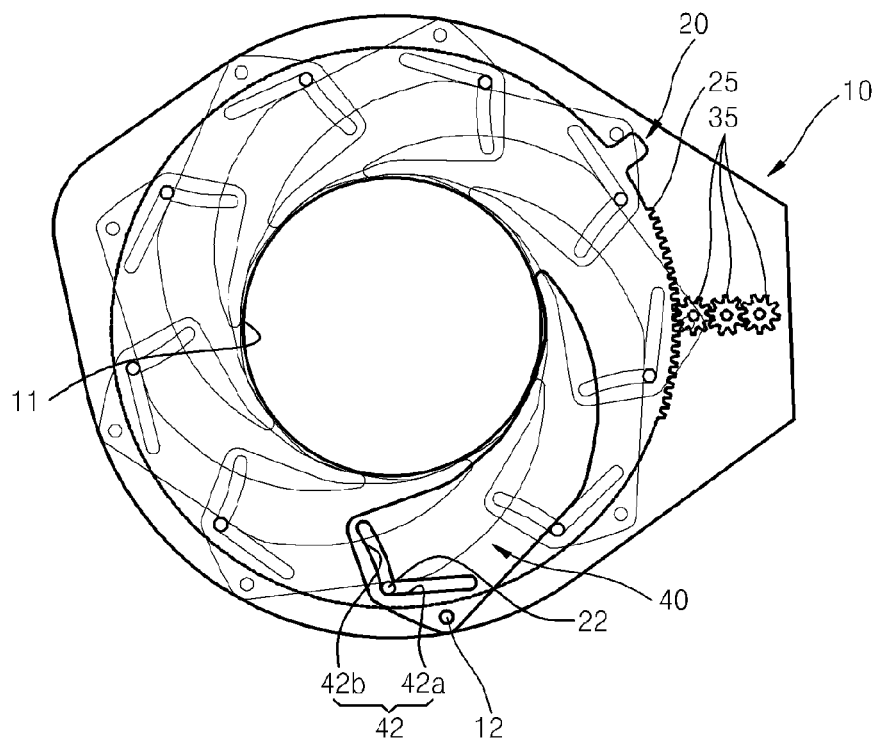
FIG. 5 is a conceptual diagram of the 2D iris plate of the light quantity adjustment apparatus of FIG. 4 in an open location.

FIG. 5 is a conceptual diagram of the 2D iris plate 40 of the apparatus 1 of FIG. 4 in the open location. Referring to FIG. 5, since a rotation of the rotation plate 20 can allow the first driving pins 22 to move in a circumferential direction, a rotational force of the rotation plate 20 can be transferred to the 2D iris plate 40 through the driving regions 42b of the first guide grooves 42 that can be coupled to the first driving pins 22 so that the 2D iris plate 40 can rotate with respect to the hinge pins 12. While the first driving pins 22 move along the driving regions 42b, the 2D iris plate 40 can gradually open the first through hole 11. Thus, the movement of the first driving pins 22 along the driving regions 42b can result in freely adjusting the open area of the first through hole 11.

If the first driving pin 22 is disposed at other end portions of the driving regions 42b of the first guide grooves 42, i.e., between the driving regions 42b and the maintenance regions 42a, the 2D iris plate 40 can be disposed at the open location in which the first through hole 11 can be completely open.

Figure 6:
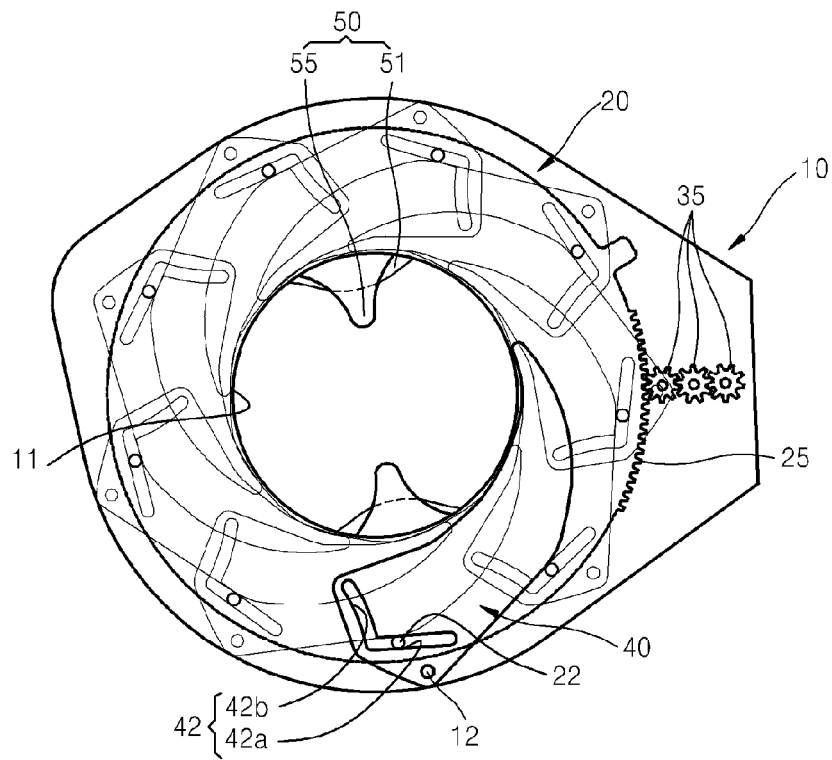
FIG. 6 is a conceptual diagram for explaining an operation of a 3D iris plate of the light quantity adjustment apparatus of FIG. 3.
Figure 7:
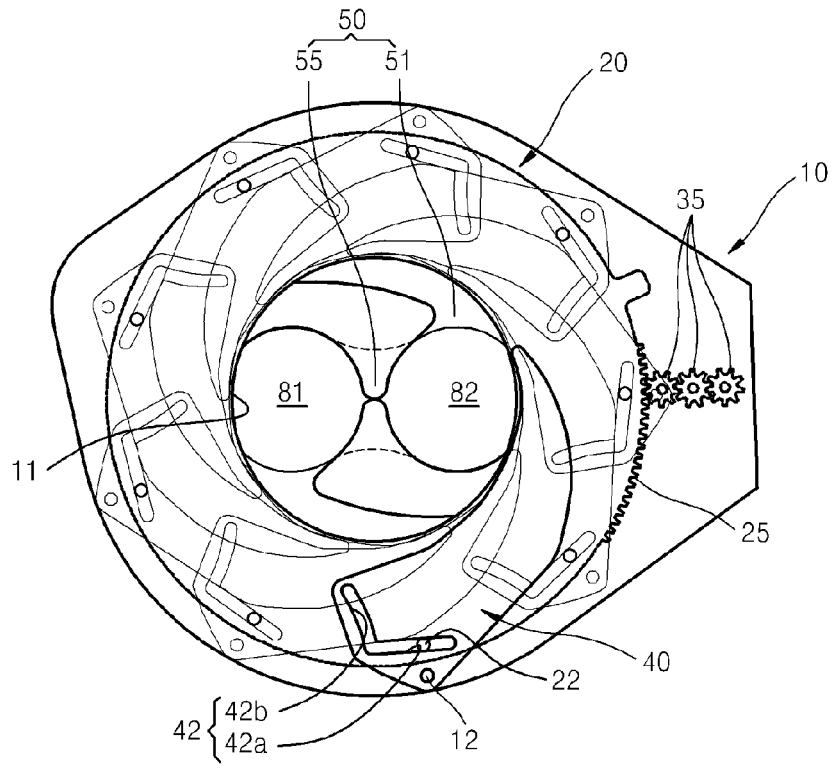
FIG. 7 is a conceptual diagram of the 3D iris plate of the light quantity adjustment apparatus of FIG. 6 in a photographing location.

FIG. 6 is a conceptual diagram for explaining an operation of the 3D iris plate 51 of the apparatus 1 of FIG. 3. FIG. 7 is a conceptual diagram of the 3D iris plate 51 of the apparatus 1 of FIG. 6 in a photographing location.

Referring to FIG. 6, the 3D iris assembly 50 can maintain a retreat location thereof until the 2D iris plate 40 moves from the closed location to the open location, and if the rotation plate 20 further rotates in a rotational direction when the 2D iris plate 40 is disposed in the open location, the 2D iris plate 40 can be continuously disposed in the open location, and the 3D iris assembly 50 can move to the photographing location.

Maintaining of the 3D iris assembly 50 at the retreat location thereof can mean that the 3D iris plate 51 and the photographing hole adjustment plate 55 move away from the first through hole 11. Moving of the 3D iris assembly 50 to the photographing location can mean that the 3D iris plate 51 and the photographing hole adjustment plate 55 move onto the first through hole 11, and thus, the first photographing hole 81 and the second photographing hole 82 for 3D photographing can be formed.

When the 2D iris plate 40 is disposed in the open location, since a direction in which the maintenance regions 42a extend can be approximately identical to a circumferential direction of the rotation plate 20, even if the rotation plate 20 further rotates, the 2D iris plate 40 may not rotate and can be continuously disposed in the open location.

Referring to FIG. 7, the 3D iris plates 51 and the photographing hole adjustment plate 55 of the 3D iris assembly 50 can cover a part of the first through hole 11 and can form the first photographing hole 81 and the second photographing hole 82.

Figure 8:
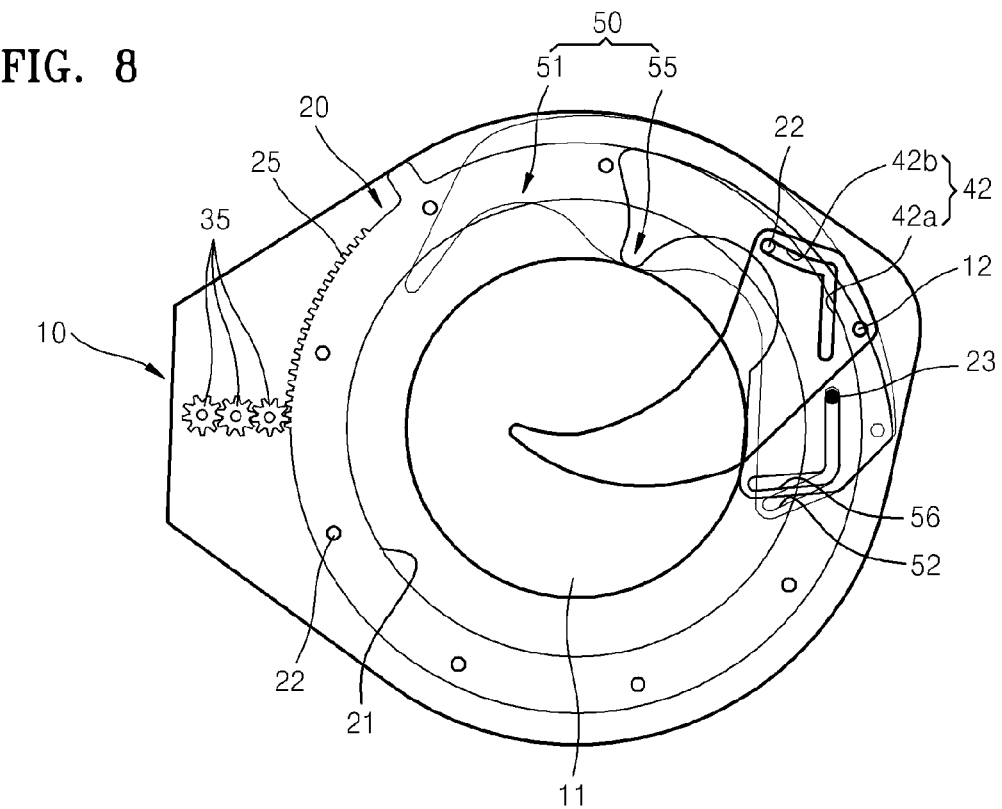
FIG. 8 is a conceptual diagram for explaining an operation of the 2D iris plate and a 3D iris plate of the light quantity adjustment apparatus of FIG. 3 in connection with a rotation plate.
Figure 9:
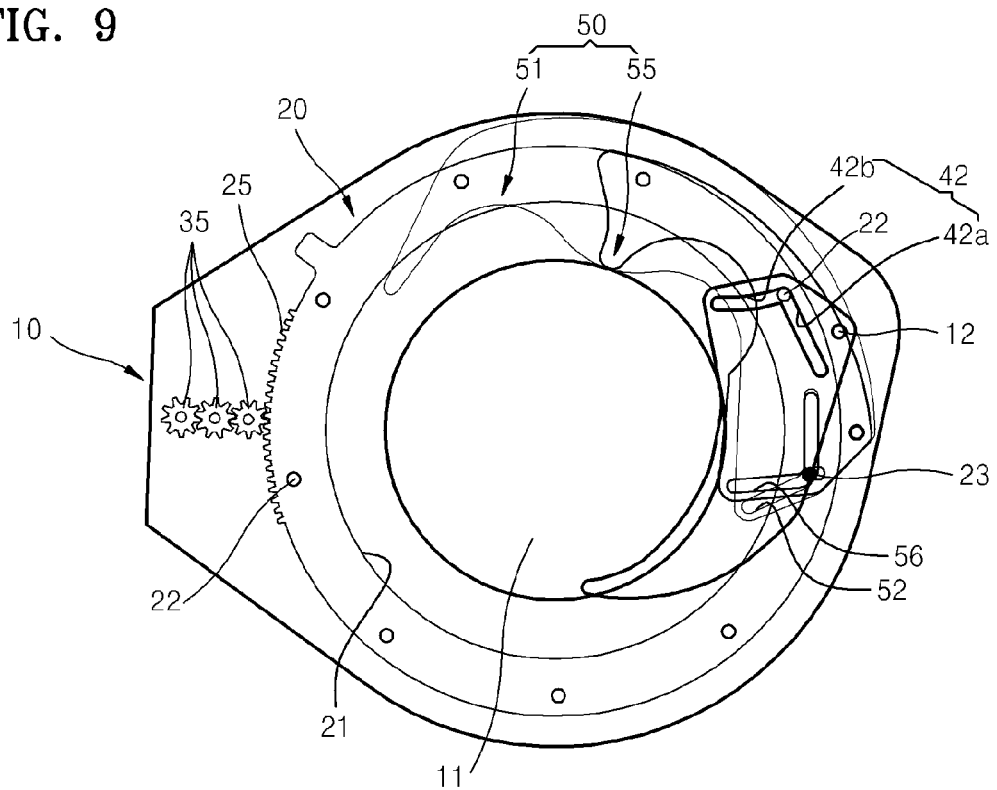
FIG. 9 is a conceptual diagram of the 2D iris plate of the light quantity adjustment apparatus of FIG. 3 in an open location.

FIG. 8 is a conceptual diagram for explaining an operation of the 2D iris plate 40 and the 3D iris plate 50 of the apparatus 1 of FIG. 3 in connection with the rotation plate 20. FIG. 9 is a conceptual diagram of the 2D iris plate 40 of the apparatus 1 of FIG. 3 in the open location. FIGS. 8 and 9 show a backside of the apparatus 1 shown in FIGS. 4 through 7.

Referring to FIG. 8, the 2D iris plate 40 can be disposed in the closed location, and the 3D iris assembly 50 can retreat away from the first through hole 11. When the rotation plate 20 rotates, the 2D iris plate 40 can rotate, and thus, the 2D iris plate 40 can move to the open location shown in FIG. 9.

When the 2D iris plate 40 is disposed between the closed location and the open location, since the open area of the first through hole 11 can be adjusted by the 2D iris plate 40, 2D photographing can be performed. A region of the rotation plate 20 that can rotate to allow the open area of the first through hole 11 to be adjusted by the 2D iris plate 40 may be referred to as a 2D photographing region.

Figure 10:
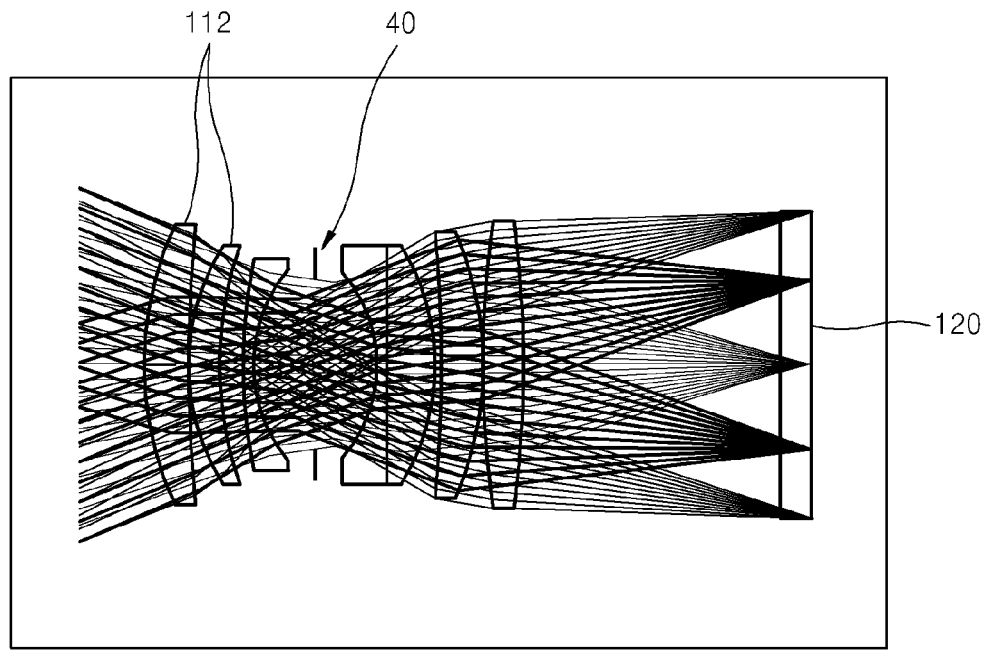
FIG. 10 is a conceptual diagram of paths of light in a 2D photographing mode of the photographing apparatus of FIG. 1.
Figure 11:
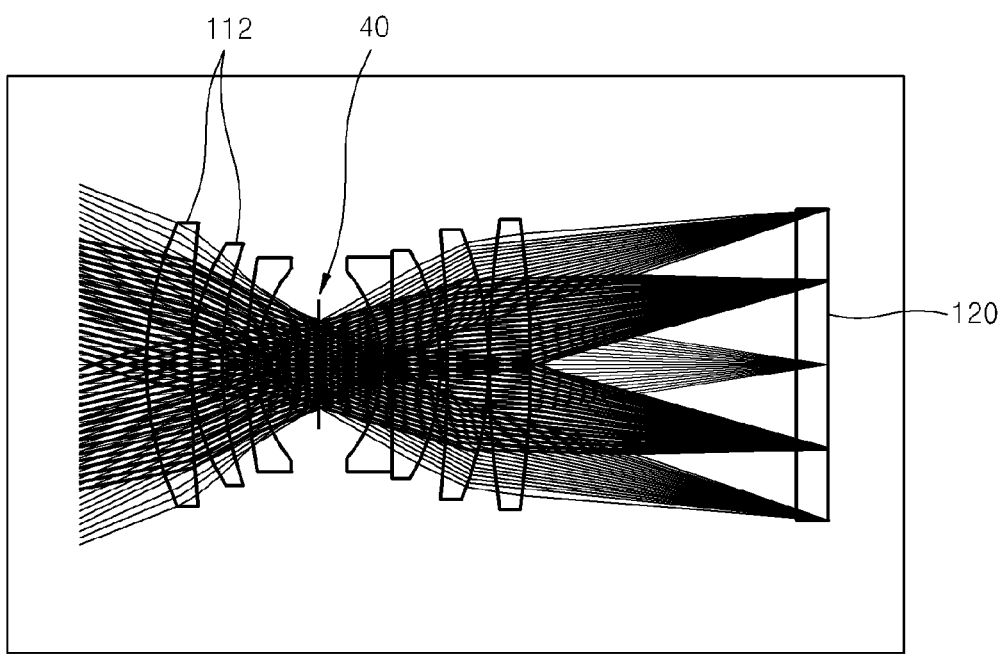
FIG. 11 is a conceptual diagram of paths of light in a 2D photographing mode of the photographing apparatus of FIG. 10 when an open area is adjusted by a 2D iris plate.

FIG. 10 is a conceptual diagram of paths of light in a 2D photographing mode of the photographing apparatus of FIG. 1. FIG. 11 is a conceptual diagram of paths of light in a 2D photographing mode of the photographing apparatus of FIG. 10 when the open area of the first through hole 11 is adjusted by the 2D iris plate 40.

Referring to FIG. 10, the 2D iris plate 40 is most opened and can obtain a sufficient quantity of light. Referring to FIG. 11, the 2D iris plate 40 can be covered slightly, and thus, the quantity of light can be reduced. Since the 3D iris assembly 50 does not exist on paths of light that passes through the lenses 112, a current operating mode can be the 2D photographing mode, in which a 2D image can be captured. Light that passes through the lenses 112 can be incident on the imaging device 120 through the 2D iris plate 40, thereby obtaining a 2D image.

Figure 12:
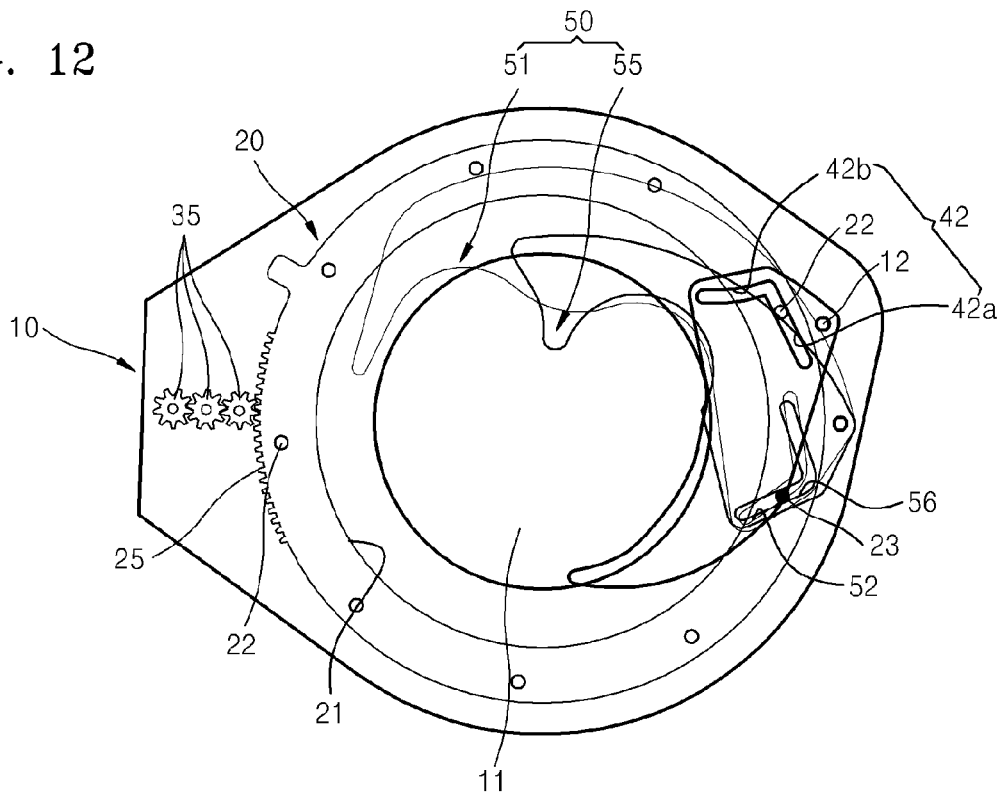
FIG. 12 is a conceptual diagram of a 3D iris plate of the light quantity adjustment apparatus of FIG. 9 while in an operation.
Figure 13:
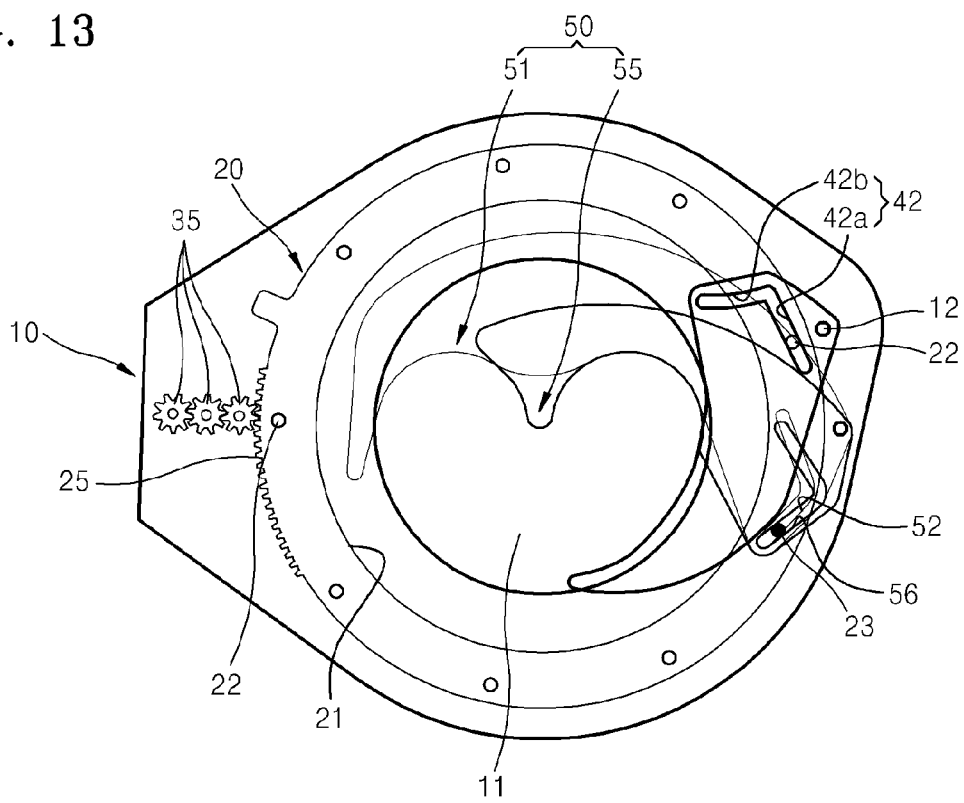
FIG. 13 is a conceptual diagram of the 3D iris plate of the light quantity adjustment apparatus of FIG. 12 at a photographing location.
Figure 14:
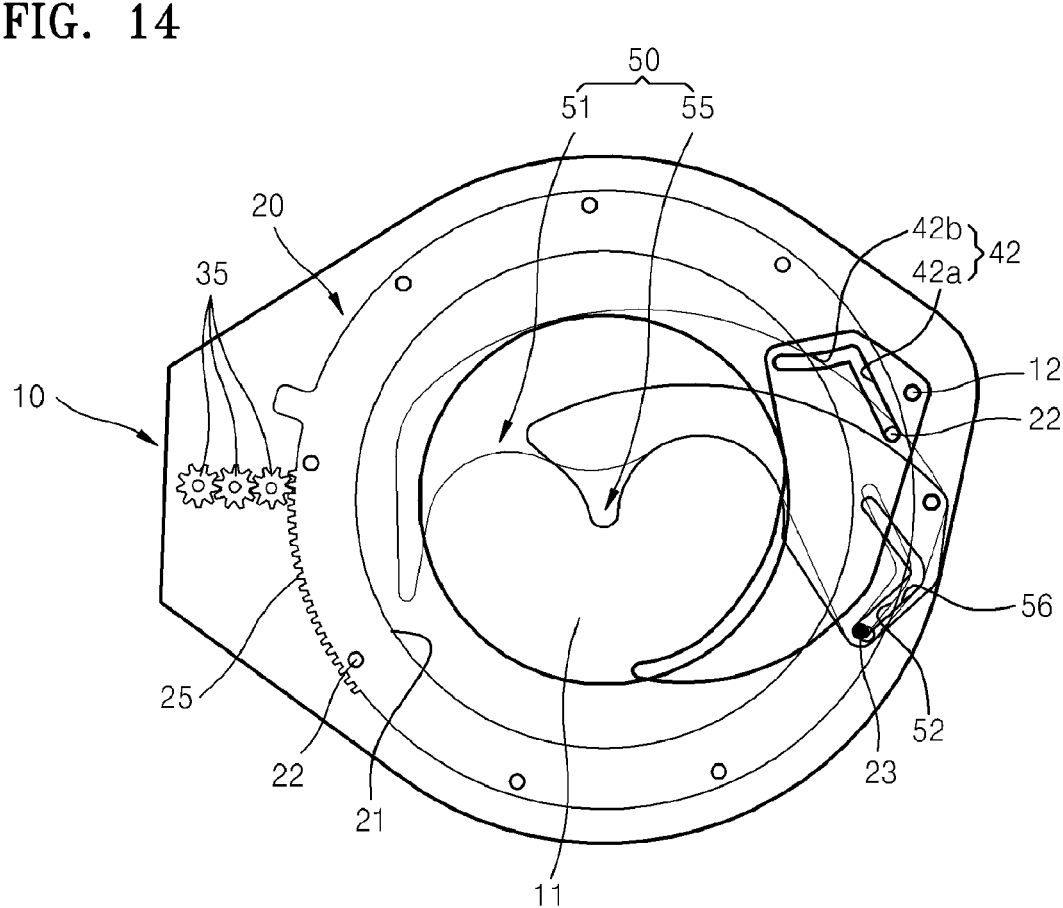
FIG. 14 is a conceptual diagram of a first photographing hole and a second photographing hole of the light quantity adjustment apparatus of FIG. 13.

FIG. 12 is a conceptual diagram of the 3D iris plates 51 of the apparatus 1 of FIG. 9 while in an operation. FIG. 13 is a conceptual diagram of the 3D iris plates 51 of the apparatus 1 of FIG. 12 at the photographing location. FIG. 14 is a conceptual diagram of the first photographing hole 81 and the second photographing hole 82 of the apparatus 1 of FIG. 13.

Referring to FIG. 12, the 3D iris assembly 50 can rotate toward the sidewall of the first through hole 11 from the retreat location away from the first through hole 11. Referring to FIG. 13, the 3D iris assembly 50 can form the first photographing hole 81 and the second photographing hole 82 for 3D photographing by covering a part of the first through hole 11.

A region of the rotation plate 20 that can rotate to allow 3D photographing by forming the first photographing hole 81 and the second photographing hole 82 via the 3D iris assembly 50 when the 2D iris plate 40 is disposed in the open location may be referred to as a 3D photographing region.

Referring to FIG. 14, further rotation of the rotation plate 20 can allow the photographing hole adjustment plates 55 to move more towards the sidewall of the first through hole 11, and thus, the sizes of the first photographing hole 81 and the second photographing hole 82 may be reduced.

Although the 3D iris assembly 50 can include one 3D iris plate 51 and one photographing hole adjustment plate 55, as shown in FIGS. 12 through 14 for better understanding and clarity, two 3D iris plates 51 and two photographing hole adjustment plates 55 can be disposed symmetrical to each other with respect to the first through hole 11, so that the first photographing hole 81 and the second photographing hole 82 may form circles. While the 3D iris assembly 50 operates, the 2D iris plate 40 can still be disposed at the open location.

In the apparatus 1 of the embodiments described above, the 3D iris assembly 50 can include the 3D iris plates 51 and the photographing hole adjustment plates 55 to form the first photographing hole 81 and the second photographing hole 82. However, embodiments are not limited thereto, and the apparatus 1 may form the first photographing hole 81 and the second photographing hole 82 by only installing either the 3D iris plates 51 or the photographing hole adjustment plates 55.

Figure 15:
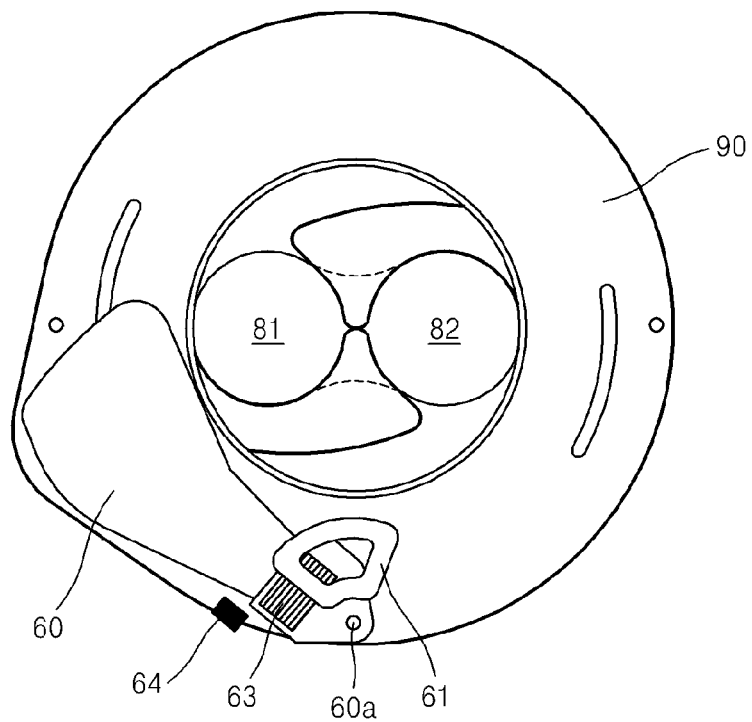
FIG. 15 is a plan view of a shading plate of the light quantity adjustment apparatus of FIG. 3 at a stop location.
Figure 16:
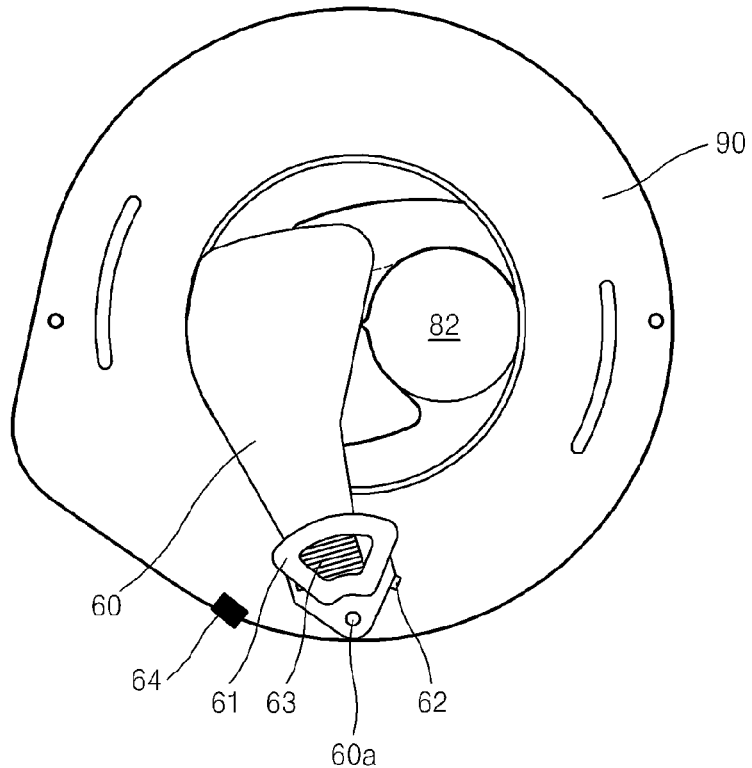
FIG. 16 is a plan view of the shading plate of the light quantity adjustment apparatus of FIG. 15 at an operating location.

FIG. 15 is a plan view of the shading plate 60 of the apparatus 1 of FIG. 3 at the stop location. FIG. 16 is a plan view of the shading plate 60 of the apparatus 1 of FIG. 15 at an operating location.

Referring to FIG. 15, the shading plate 60 can be rotatably coupled to the second middle plate 90 by a hinge pin 60a. In the 2D photographing mode where photographing can be performed while the 2D iris plate 40 adjusts the open area of the first through hole 11, the yolk 64 can operate, and thus, the shading plate 60 can be maintained at the stop location away from the first through hole 11.

When the 3d iris assembly 50 operates and forms the first photographing hole 81 and the second photographing hole 82, a current can flow into the coil 61, and a magnetic force can be applied to the magnet portion 63. Thus, the shading plate 60 may move to the operating location, at which the first photographing hole 81 or the second photographing hole 82 can be closed.

Referring to FIG. 16, since the first photographing hole 81 can be closed by the shading plate 60, photographing can be performed through the second photographing hole 82. While the shading plate 60 rotates, the Hall sensor 62 may detect a location of the shading plate 60 and can use the detected location to drive the shading plate 60.

Figure 17:
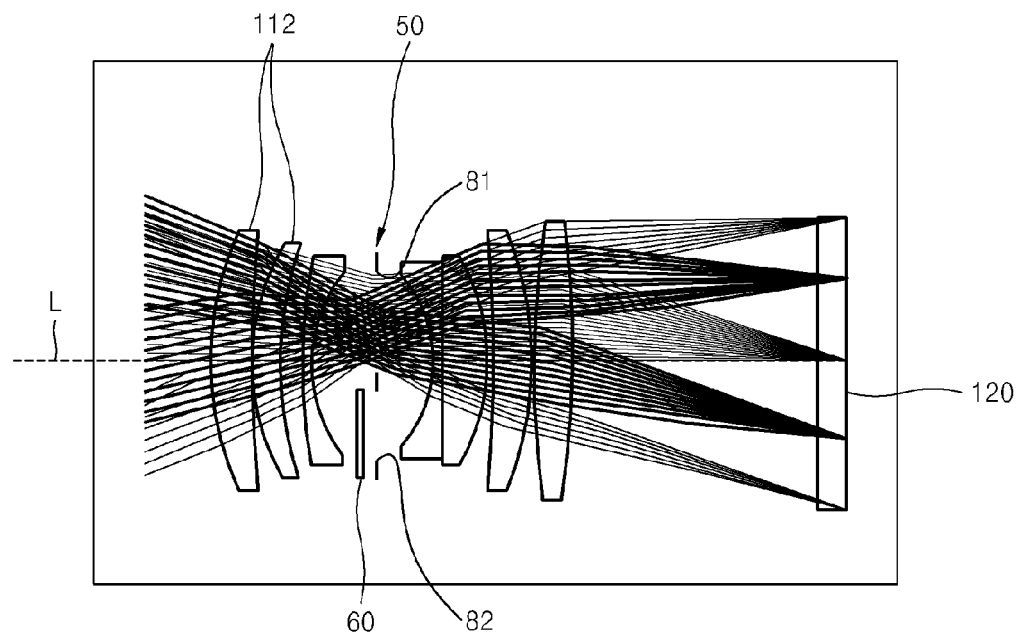
FIG. 17 is a conceptual diagram of paths of light that passes through a first photographing hole in a 3D photographing mode of the photographing apparatus of FIG. 3.
Figure 18:
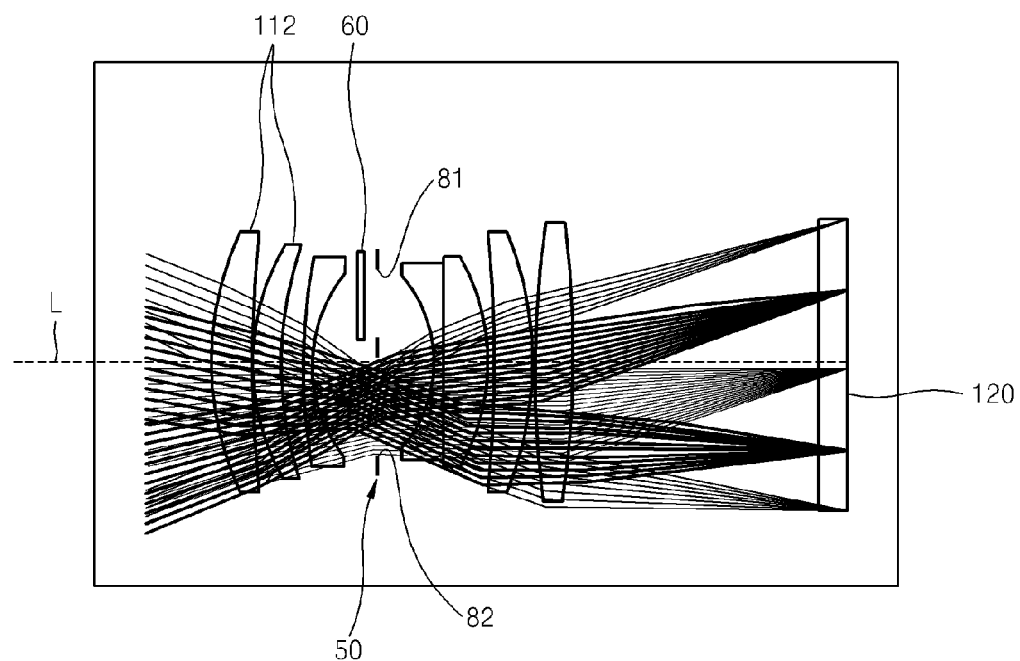
FIG. 18 is a conceptual diagram of paths of light that passes through a second photographing hole in the 3D photographing mode of the photographing apparatus of FIG. 17.

FIG. 17 is a conceptual diagram of paths of light that passes through the first photographing hole 81 in the 3D photographing mode of the photographing apparatus of FIG. 3. FIG. 18 is a conceptual diagram of paths of light that passes through the second photographing hole 82 in the 3D photographing mode of the photographing apparatus of FIG. 17.

Referring to FIG. 17, a first image can be captured through the first photographing hole 81 when the shading plate 60 closes the second photographing hole 82. Referring to FIG. 18, a second image can be captured through the second photographing hole 82 when the shading plate 60 closes the first photographing hole 81. Left and right eyes of a person observing a 3D image can observe an angle difference between the first image and the second image, thereby naturally forming a 3D image.

When a moving image is to be captured as a 3D image, the control unit 140 of FIG. 1 may control image quality for frames of the moving image and the shading plate driving unit 65. The control unit 140 can synchronize a driving frequency used to move the shading plate 60. Since a speed of the imaging device 120 for obtaining an image can be fast or slow according to the image quality of the frames of the moving image, the synchronization of the driving frequency can mean a fast or slow movement of the shading plate 60 in accordance with the image quality of the frames of the moving image.

For example, a time taken to obtain a single frame while a moving image is captured can be divided in half. Thus, one half time can be used to obtain a first image through the first photographing hole 81, and the other half time can be used to obtain a second image through the second photographing hole 82.

Figure 19:
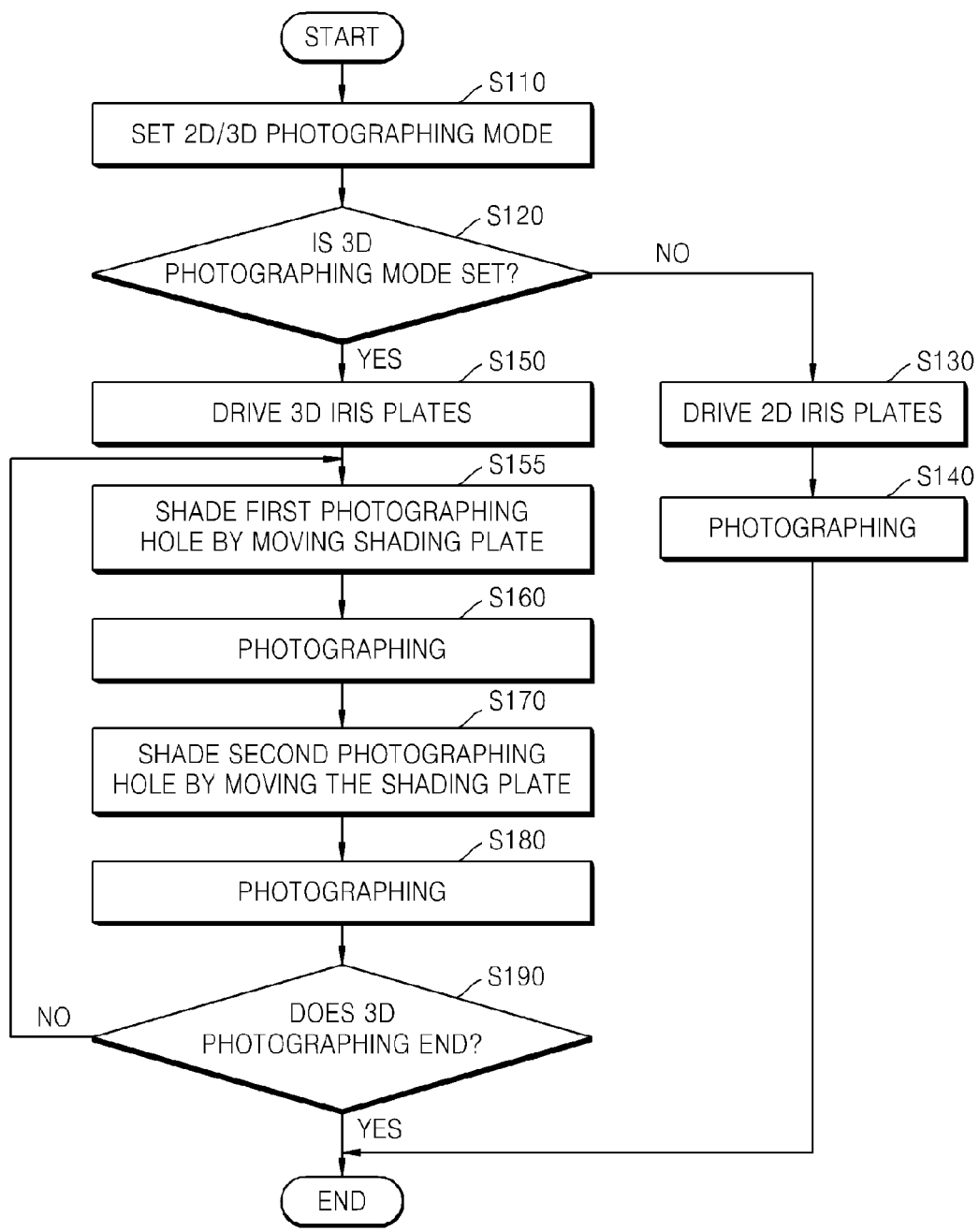
FIG. 19 is a flowchart illustrating photographing operations performed by the photographing apparatus of FIG. 1, according to an embodiment.

FIG. 19 is a flowchart illustrating photographing operations performed by the photographing apparatus of FIG. 1, according to an embodiment. Referring to FIG. 19, the 2D photographing mode or the 3D photographing mode can be selectively performed by using a single photographing apparatus.

In operation 110, whether to perform the 2D photographing mode or to perform the 3D photographing mode can be set or can be in advance. If a photographing shutter is manipulated, in operation 120, it can be confirmed that the 3D photographing mode is set in operation 110.

If the 2D photographing mode is set, in operation 130, the 2D iris plates 40 of FIG. 2 can be driven to adjust the open area of the first through hole 11, and then in operation 140, a 2D image can be captured. The open area of the first through hole 11 can be determined according to, for example, brightness of a subject to be captured.

If the 3D photographing mode is set, in operation 150, the 2D iris plates 40 can be disposed at the open location, and the 3D iris plates 51 can be driven, thereby forming the first photographing hole 81 and the second photographing hole 82.

After the first photographing hole 81 and the second photographing hole 82 are formed, in operation 155, the first photographing hole 81 can be covered by moving the shading plate 60, and in operation 160, a second image can be captured by capturing light that passes through the second photographing hole 82.

Thereafter, in operation 170, the second photographing hole 82 can be covered by moving the shading plate 60, and in operation 180, a first image can be captured by capturing light that passes through the first photographing hole 81.

Embodiments are not limited to the stated order of covering the first photographing hole 81 and the second photographing hole 82, and thus, the first photographing hole 81 may be covered after the second photographing hole 82 is firstly covered.

In operation 190, it can be confirmed whether the 3D photographing mode ends. If the 3D photographing mode is to continue to be performed, another 3D photographing may be performed by repeating operations 155 through 180. Such repeating of 3D photographing may be applied to capturing of a still image or a moving image.

A 3D image can be formed by using the first image and the second image obtained by moving the shading plate 60.

Figure 20:
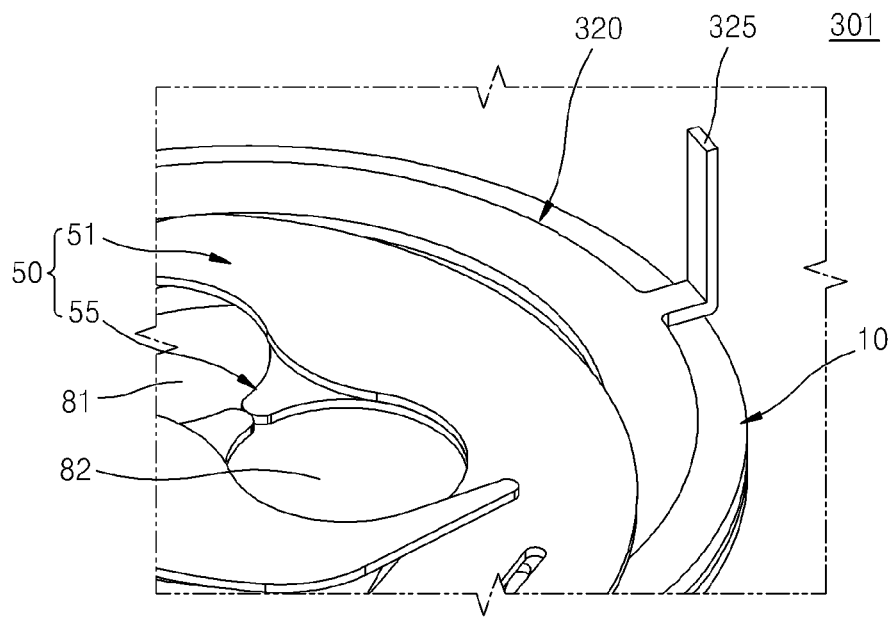
FIG. 20 is a perspective view of a part of a light quantity adjustment apparatus according to another embodiment.

FIG. 20 is a perspective view of a part of an apparatus 301 that can adjust a quantity of light according to another embodiment. Referring to FIG. 20, when a rotation plate 320 rotates with respect to the support plate 10, the 3D iris assembly 50 that can include the 3D iris plates 51 and the photographing hole adjustment plates 55 can form the first photographing hole 81 and the second photographing hole 82, thereby performing 3D photographing.

Although the apparatus 301 is similar to the apparatus 1 of FIGS. 1 through 18, both apparatuses 301 and 1 may be different from each other with respect to an element for rotating the rotation plate 320. The rotation plate 320 can include an outwardly protruding lever 325, and thus, the rotation plate 320 may rotate by a rotational force transferred through the lever 325.

The apparatus 1 of FIGS. 1 through 18 can be controlled by the control unit 140, and thus the rotation plate 20 can automatically operate. However, the lever 325 can be rotated by a user, and thus the apparatus 301 can select any one of a 3D photographing mode and a 2D photographing mode. Further, when the 2D photographing mode is selected, since a rotation number of the rotation plate 320 can be adjusted by manipulating the lever 325, a 2D iris plate can manually adjust an open area of a first through hole.

Figure 21:
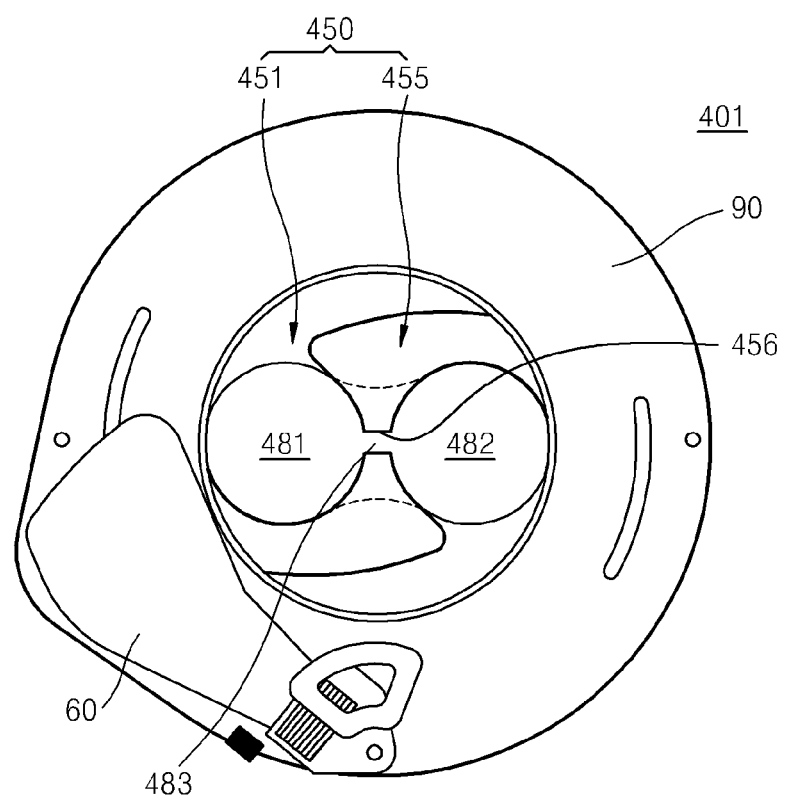
FIG. 21 is a perspective view of a part of a light quantity adjustment apparatus according to another embodiment.

FIG. 21 is a perspective view of a part of an apparatus 401 that can adjust a quantity of light according to another embodiment. Although the apparatus 401 is similar to the apparatus 1 of FIGS. 1 through 18, both apparatuses 401 and 1 may be different from each other with respect to a 3D iris assembly 450 that can form a first photographing hole 481 and a second photographing hole 482.

The 3D iris assembly 450 can include two 3D iris plates 451 that can be disposed symmetrical to each other with respect to the center of the apparatus 401 and two photographing hole adjustment plates 455 that can be disposed symmetrical to each other with respect to the center of the apparatus 401 and can assist the two 3D iris plates 451. The two photographing hole adjustment plates 455 can include cutting portions 456 that can have spaced apart opposite ending portions so that the first photographing hole 481 and the second photographing hole 482 can be connected to each other.

Therefore, even when the 3D iris assembly 450 is disposed at a photographing location where the first photographing hole 481 and the second photographing hole 482 are formed, a connection path 483 that can connect the first photographing hole 481 and the second photographing hole 482 can be formed.

The apparatus 1 of FIGS. 1 through 18 may not connect the first photographing hole 81 and the second photographing hole 82 formed by the 3D iris assembly 50. Referring to FIGS. 17 and 18, a first image and a second image can be obtained through the first photographing hole 81 and the second photographing hole 82, and a 3D image can be obtained by using the first image and the second image.

However, since optical centers of the first image and the second image can correspond to centers of the first photographing hole 81 and the second photographing hole 82, an optical center of the 3D image obtained by the first image and the second image may not correspond to a location of a subject to be photographed. That is, according to the 3D image, the subject can be relatively darker than the background, whereas the background can be brighter than the subject.

If the apparatus 401 is used to perform photographing when the shading plate 60 closes the second photographing hole 482, light can be received through the first photographing hole 481 and the connection path 483. If photographing is performed when the shading plate 60 closes the first photographing hole 481, light can be received through the second photographing hole 482 and the connection path 483. Thus, since the first image and the second image captured to obtain the 3D image can obtain a greater quantity of light through the connection path 483, a center image can be brighter in the 3D image formed by using the first image and the second image.

As described above, the photographing apparatus can perform 2D photographing by using a 2D iris assembly and can perform 3D photographing by using a 3D iris assembly, thereby selectively photographing a 2D image or a 3D image.

Further, the 2D iris assembly and the 3D iris assembly, which enable selective photographing of a 2D image or a 3D image, can operate in connection with a rotation plate, thereby capturing a 3D image without separately using a driving device or mechanical elements.

Furthermore, a 2D image or a 3D image can be selectively captured just by rotating the rotation plate of a light quantity adjustment apparatus, thereby providing a 3D image photographing apparatus having low noise and low power consumption.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

Moreover, no item or component is essential to the practice of the invention unless the element is specifically described as "essential" or "critical". It will be recognized that the terms "comprising," "including," and "having," as used herein, are specifically intended to be read as open-ended terms of art. The use of the terms "a" and "an" and "the" and similar referents in the context of describing the invention (especially in the context of the following claims) are to be construed to cover both the singular and the plural. In addition, it should be understood that although the terms "first," "second," etc. may be used herein to describe various elements, these elements should not be limited by these terms, which are only used to distinguish one element from another.

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A light quantity adjustment apparatus comprising:
   a support plate comprising a first through hole through which light passes;
   a rotation plate comprising a second through hole corresponding to the first through hole and rotatably disposed with respect to the support plate;
   a plurality of 2D iris plates rotatably connected to the support plate so as to move between an open location in which the first through hole is completely opened and a closed location in which the first through hole is completely closed, the plurality of 2D iris plates engaged with the rotation plate and adjusting an open area of the first through hole according to a rotation of the rotation plate;
   two 3D iris plates each having one end rotatably connected to the support plate and another end engaged with the rotation plate, the two 3D iris plates moving between a retreat location away from the first through hole according to the rotation of the rotation plate and a photographing location where a first photographing hole and a second photographing hole are formed by covering a part of the first through hole;
   a shading plate that moves between an operating location where the first photographing hole or the second photographing hole is closed and a stop location away from the first through hole; and
   a shading plate driving unit that drives the shading plate.

2. The light quantity adjustment apparatus of claim 1, wherein the two 3D iris plates are disposed at the retreat location while the plurality of 2D iris plates move from the closed location to the open location according to the rotation of the rotation plate, and, when the rotation plate further rotates after the plurality of 2D iris plates move to the open location, the plurality of 2D iris plates remain at the open location and the two 3D iris plates move to the photographing location.

3. The light quantity adjustment apparatus of claim 1, wherein the rotation plate comprises a plurality of first driving pins, and the plurality of 2D iris plates comprise a plurality of first guide grooves extending in such a way as to rotate the plurality of 2D iris plates according to the rotation of the rotation plate when the plurality of first driving pins are inserted into the plurality of first guide grooves.

4. The light quantity adjustment apparatus of claim 3, wherein each of the plurality of first guide grooves comprises a driving region curved to rotate the plurality of 2D iris plates according to the rotation of the rotation plate, and a maintenance region extending bent from an end portion of the driving region so that the plurality of 2D iris plates remain at the open location according to the rotation of the rotation plate.

5. The light quantity adjustment apparatus of claim 4, wherein the rotation plate comprises a plurality of second driving pins, and the two 3D iris plates comprise a plurality of second guide grooves extending in such a way as to rotate the two 3D iris plates according to the rotation of the rotation plate when the plurality of second driving pins are inserted into the plurality of second guide grooves.

6. The light quantity adjustment apparatus of claim 5, wherein each of the plurality of second guide grooves comprises a non-operating region extending in a circumferential direction of the rotation plate so that the two 3D iris plates are disposed at the retreat location while the plurality of first driving pins move along the driving region, and an operating region extending inclined from an end portion of the non-operating region so that the two 3D iris plates rotate according to the rotation of the rotation plate,
   wherein the plurality of first driving pins are disposed at the maintenance region when the plurality of second driving pins are disposed at the operating region.

7. The light quantity adjustment apparatus of claim 6, wherein the two 3D iris plates comprise two concave portions in semicircle shapes corresponding to sidewalls of the first photographing hole and the second photographing hole and are disposed symmetrical to each other with respect to the first through hole.

8. The light quantity adjustment apparatus of claim 7, further comprising:
   at least two photographing hole adjustment plates disposed symmetrical to each other with respect to the first through hole and each of the at least two photographing hole adjustment plates comprising,
      a concave portion corresponding to one of the two concave portions of the two 3D iris plates and rotatably connected to the support plate, and
      a third guide groove comprising a non-operating region extending in such a way as to match the non-operating region of one of the plurality of second guide grooves and an operating region extending more inclined toward an inner side than the operating region of one of the plurality of second guide grooves and into which the plurality of second driving pins are inserted,
   wherein, when the plurality of second driving pins move toward end portions of the operating region of each of the plurality of second guide grooves and the operating region of each of the plurality of third guide grooves according to the rotation of the rotation plate, the at least two photographing hole adjustment plates move more toward the sidewall of the first through hole so that sizes of the first photographing hole and the second photographing hole are reduced.

9. The light quantity adjustment apparatus of claim 8, wherein the at least two photographing hole adjustment plates comprise cutting portions in opposite end portions thereof and are spaced apart from each other so that the first photographing hole and the second photographing hole are connected to each other.

10. The light quantity adjustment apparatus of claim 3, wherein the plurality of 2D iris plates are rotatably coupled to one surface of the support plate, the rotation plate is disposed on another surface of the support plate, and the plurality of first driving pins protrude from a surface of the rotation plate facing the support plate, pass through guide holes formed in a circumferential direction of the support plate, and are inserted into the plurality of first guide grooves of the plurality of 2D iris plates.

11. The light quantity adjustment apparatus of claim 10, wherein the two 3D iris plates are disposed in another surface of the rotation plate and have outer edges rotatably coupled to the other surface of the support plate, and the plurality of second driving pins protrude from the other surface of the rotation plate and are inserted into the plurality of second guide grooves formed in the two 3D iris plates.

12. The light quantity adjustment apparatus of claim 1, wherein the plurality of 2D iris plates comprise a plurality of first driving pins, and the rotation plate comprises a plurality of first guide grooves that guide the plurality of first driving pins so that the plurality of 2D iris plates rotate according to the rotation of the rotation plate when the plurality of first driving pins are inserted into the plurality of first guide grooves.

13. The light quantity adjustment apparatus of claim 1, wherein the two 3D iris plates comprise a plurality of second driving pins, and the rotation plate comprises a plurality of second guide grooves that guide the plurality of second driving pins so that the two 3D iris plates rotate according to the rotation of the rotation plate when the plurality of second driving pins are inserted into the plurality of second guide grooves.

14. The light quantity adjustment apparatus of claim 1, further comprising: a rotation plate driving unit that drives the rotation plate.

15. The light quantity adjustment apparatus of claim 14, wherein the rotation plate driving unit comprises a motor disposed in the support plate and a gear assembly connected to a rotational axis of the motor, and the rotation plate comprises a gear surface engaged with the gear assembly on an outer circumferential surface thereof.

16. The light quantity adjustment apparatus of claim 1, wherein the rotation plate comprises an outwardly protruding lever and rotates by a force transferred through the lever.

17. A photographing apparatus comprising:
   a light quantity adjustment apparatus comprising,
      a support plate comprising a first through hole through which light passes,
      a plurality of 2D iris plates rotatably connected to the support plate so as to move between an open location in which the first through hole is completely opened and a closed location in which the first through hole is completely closed, the plurality of 2D iris plates engaged with a rotation plate and that adjust an open area of the first through hole according to a rotation of the rotation plate,
      two 3D iris plates each having one end rotatably connected to the support plate and another end engaged with the rotation plate, the two 3D iris plates move between a retreat location away from the first through hole according to the rotation of the rotation plate and a photographing location where a first photographing hole and a second photographing hole are formed by covering a part of the first through hole,
      a shading plate for moving between a location where the first photographing hole or the second photographing hole is closed and a location away from the first through hole, and
      a shading plate driving unit for driving the shading plate,
      wherein the rotation plate comprises a second through hole corresponding to the first through hole, rotatably disposed with respect to the support plate, coupled to the plurality of 2D iris plates and the two 3D iris plates, and rotating between a 2D photographing region where the plurality of 2D iris plates operate and a 3D photographing region where the two 3D iris plates operate when the plurality of 2D iris plates are disposed at the open location;
   an imaging device that converts light that passes through the light quantity adjustment apparatus into an electrical signal; and
   a control unit that performs photographing by controlling the imaging device and the shading plate driving unit,
   wherein, when in a 2D photographing mode, the rotation plate is disposed at the 2D photographing region, and the control units controls the shading plate driving unit and moves the shading plate to the retreat location to perform photographing, and when in a 3D photographing mode, the rotation plate is disposed at the 3D photographing region, and the control unit controls the shading plate driving unit so that the shading plate closes the first photographing hole when obtaining a first image and the shading plate closes the second photographing hole when obtaining a second image.

18. The photographing apparatus of claim 17, wherein, when a moving image is captured in the 3D photographing mode, the control unit synchronizes an image quality of frames of the moving image and a frequency that controls the shading plate driving unit.

19. The photographing apparatus of claim 17, wherein the rotation plate comprises a plurality of first driving pins, and the plurality of 2D iris plates comprise a plurality of first guide grooves each comprising a driving region curved to rotate the plurality of 2D iris plates according to the rotation of the rotation plate when the plurality of first driving pins are inserted into the plurality of first guide grooves, and a maintenance region extending bent from an end portion of the driving region so that the plurality of 2D iris plates remain at the open location according to the rotation of the rotation plate.

20. The photographing apparatus of claim 19, wherein
   the rotation plate comprises a plurality of second driving pins, and
   the two 3D iris plates comprise a plurality of extending second guide grooves into which the plurality of second driving pins are inserted, each of the second guide grooves comprising
      a non-operating region extending in a circumferential direction of the rotation plate so that the two 3D iris plates are disposed at the retreat location while the plurality of first driving pins move along the driving region, and
      an operating region extending inclined from an end portion of the non-operating region so that the two 3D iris plates rotate according to the rotation of the rotation plate.

* * * * *